United States Patent
Ngcobo et al.

(10) Patent No.: US 9,588,488 B2
(45) Date of Patent: Mar. 7, 2017

(54) METHOD OF OPERATING A LASER AND LASER APPARATUS USING INTRA-CAVITY DIGITAL HOLOGRAMS

(71) Applicant: CSIR, Brummeria, Pretoria (ZA)

(72) Inventors: Sandile Ngcobo, Pretoria (ZA); Ihar Anatolievich Litvin, Pretoria (ZA); Liesl Burger, Pretoria (ZA); Andrew Forbes, Irene (ZA)

(73) Assignee: CSIR, Brummeria, Pretoria (ZA)

( * ) Notice: Subject to any disclaimer, the term of this patent is extended or adjusted under 35 U.S.C. 154(b) by 0 days.

(21) Appl. No.: 14/173,010

(22) Filed: Feb. 5, 2014

(65) Prior Publication Data

US 2015/0009547 A1 Jan. 8, 2015

Related U.S. Application Data

(60) Provisional application No. 61/787,260, filed on Mar. 15, 2013.

(51) Int. Cl.
G03H 1/02 (2006.01)
G03H 1/08 (2006.01)
(Continued)

(52) U.S. Cl.
CPC ............. *G03H 1/08* (2013.01); *G03H 1/0005* (2013.01); *G03H 1/2286* (2013.01);
(Continued)

(58) Field of Classification Search
CPC ....... G11B 7/0065; G11B 7/083; G11B 7/128; G11B 7/00772; G11B 7/127; G11B 7/24044; G11B 2007/0006; G11B 2007/0013; G11B 7/1381; G11B 7/005; G11B 7/126; G11B 7/1353; G11B 7/1362; G11B 7/1365; G11B 7/1369; G11B 7/1374
(Continued)

(56) References Cited

U.S. PATENT DOCUMENTS 6,292,505 B1 * 9/2001 Takenaka ................ H01S 3/107
372/106
8,295,321 B2 10/2012 Ando et al.
(Continued)

*Primary Examiner* — Scott J Sugarman
*Assistant Examiner* — Sharrief Broome
(74) *Attorney, Agent, or Firm* — Nixon Peabody LLP; Jeffrey L. Costellia

(57) ABSTRACT

Laser apparatus includes an output coupler, a gain medium for generating laser light, a rear optical element, and an input coupler. The input coupler is arranged to direct a pump beam to the gain medium and to define an optical path between the output coupler and the rear optical element. The rear optical element is a spatial light modulator arranged to act as an intra-cavity digital holographic mirror which can be digitally addressed. The spatial light modulator displays selectively a gray-scale image of a hologram thereby to phase-modulate laser light in the cavity, thus making it possible to generate an output laser beam having a desired characteristic. The apparatus includes a computer arranged to generate at least one hologram corresponding to a desired output beam characteristic, and a driver circuit responsive to an output from the computer to generate a corresponding gray-scale image of the hologram on the spatial light modulator.

9 Claims, 6 Drawing Sheets

(51) Int. Cl.
  *G03H 1/22*    (2006.01)
  *G03H 1/00*    (2006.01)
  *H01S 3/105*   (2006.01)
  H01S 3/081    (2006.01)
  H01S 3/0941   (2006.01)
  H01S 3/16     (2006.01)

(52) U.S. Cl.
  CPC ........... *G03H 1/2294* (2013.01); *H01S 3/105* (2013.01); *H01S 3/0815* (2013.01); *H01S 3/09415* (2013.01); *H01S 3/1611* (2013.01); *H01S 3/1643* (2013.01); *H01S 2301/20* (2013.01); *H01S 2301/203* (2013.01)

(58) Field of Classification Search
  USPC ...................................... 359/1, 27
  See application file for complete search history.

(56) References Cited

U.S. PATENT DOCUMENTS

| | | | |
|---|---|---|---|
| 2004/0101168 A1* | 5/2004 | Kostrzewski | G06E 3/001 |
| | | | 382/115 |
| 2006/0098698 A1* | 5/2006 | Arbore | 372/21 |
| 2007/0024999 A1* | 2/2007 | Crossland et al. | 359/859 |
| 2008/0298404 A1* | 12/2008 | 'T Hooft | G11B 7/0065 |
| | | | 372/28 |
| 2009/0122376 A1* | 5/2009 | Matoba | G03H 1/26 |
| | | | 359/35 |
| 2010/0054284 A1* | 3/2010 | Dekker | H01S 3/1086 |
| | | | 372/3 |
| 2011/0058579 A1 | 3/2011 | Ohtake et al. | |
| 2012/0081769 A1* | 4/2012 | Dergachev | 359/27 |

* cited by examiner

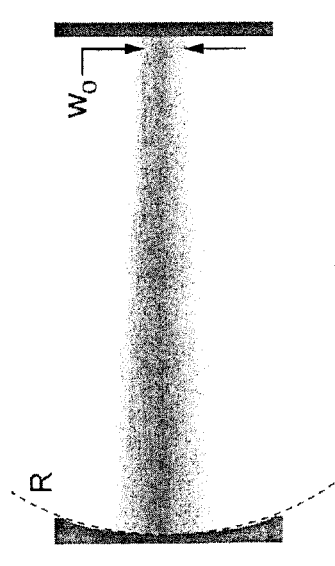
FIG. 4A
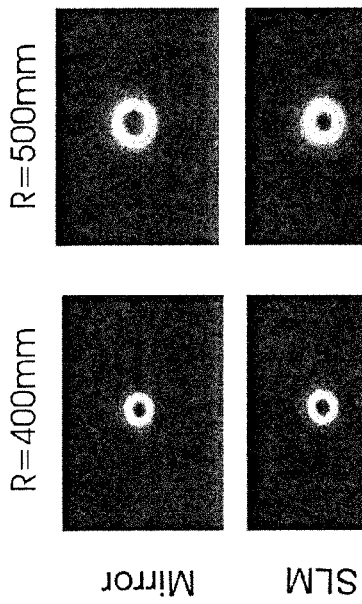
FIG. 4B
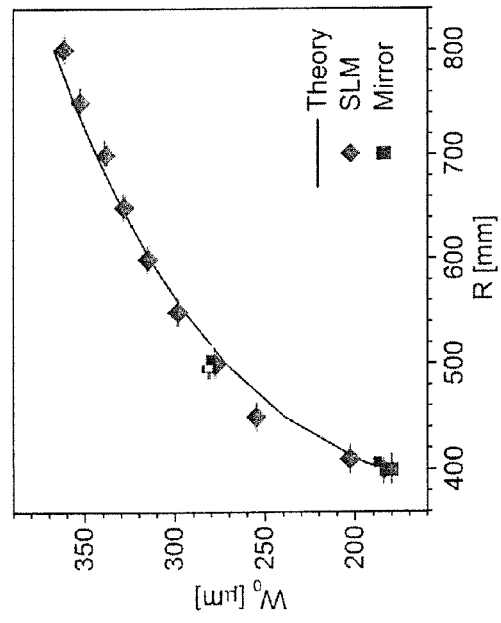
FIG. 4C
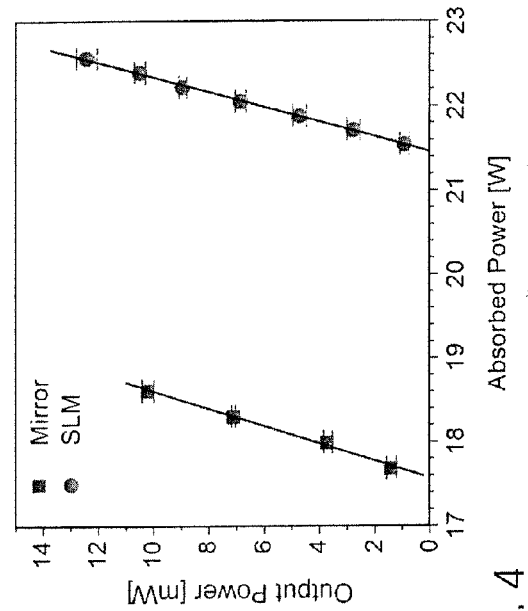
FIG. 4D
Fig. 4

METHOD OF OPERATING A LASER AND LASER APPARATUS USING INTRA-CAVITY DIGITAL HOLOGRAMS

BACKGROUND OF THE INVENTION

This invention relates to a method of operating a laser and to laser apparatus making use of intra-cavity beam shaping.

Laser beam shaping tools have matured over the past few decades to allow external (to the laser cavity) reshaping of a laser beam to a desired transverse profile[4]. The procedures for determining the desired optical transformation are well known[4], and may be implemented by a variety of methods, for example, by diffractive optical elements, free-form optics or more recently by digital holograms written to a spatial light modulator (SLM).

However, there are advantages to rather shaping the light inside the laser cavity (intra-cavity laser beam shaping) and this has been a subject of interest for a number of years[2,3], with several design techniques available[5-10], some of which have successfully been implemented, for example using phase-only[11-14], amplitude-only[1-3, 15, 16], and optically-addressed liquid crystal[17] optical elements for spatial mode selection. All of these techniques require custom optics, for example, a diffractive mirror or phase plate designed for a specific mode, while the optically-addressed liquid crystal approach requires external beam shaping (e.g., diffractive optics or SLMs) to address the optic, a wavefront sensor and optimization routine to iterate towards the desired phase profile, and thus results in unconventional, metre-long, cavities.

There have also been attempts at dynamic intra-cavity beam control with deformable mirrors[18-23], but such elements have very limited stroke, are limited in the phase profiles that can be accommodated[18,19], and thus have found little application in laser mode shaping. Rather, such mirrors have been instrumental in high power applications such as correcting mode distortions (e.g., due to thermal load) or to maximizing energy extraction and optimization of laser brightness[20-23]. To date no technique has been demonstrated for the on-demand selection of laser modes.

It is an object of the invention to provide a method of operating a laser and corresponding apparatus which uses intra-cavity beam control and which allows such on-demand laser mode selection.

SUMMARY OF THE INVENTION

According to the invention there is provided laser apparatus including:
- an output coupler;
- a gain medium for generating laser light;
- a rear optical element; and
- an input coupler arranged to direct a pump beam to the gain medium and to define an optical path between the output coupler and the rear optical element, wherein the rear optical element is a spatial light modulator arranged to act as an intra-cavity digital holographic mirror and to display selectively a gray-scale image of a hologram thereby to phase-modulate laser light in the cavity, to generate an output laser beam having a desired characteristic.

The spatial light modulator is preferably a phase-only reflective device arranged to operate as a digitally addressed holographic mirror.

Preferably the apparatus includes an intra-cavity Brewster window to assist the spatial light modulator to operate with the desired polarization, vertical or horizontal.

The spatial light modulator is preferably arranged at normal incidence in the cavity.

Preferably, the spatial light modulator has a reflectivity as a function of phase with a variance of less than 1%.

In a prototype of the apparatus, the spatial light modulator was a device comprising parallel-aligned nematic liquid crystal.

The input coupler preferably comprises a first mirror coated for high transmission at the pump beam wavelength and high reflectance at a lasing beam wavelength, and which is oriented to direct the pump beam to the gain medium, and to direct a lasing beam to the spatial light modulator.

The output coupler preferably comprises a second mirror coated for high transmission at the pump beam wavelength and high reflectance at the lasing beam wavelength, and which is oriented to separate the pump beam and the output laser beam.

The laser apparatus may include a computer arranged to generate at least one hologram corresponding to a desired output beam characteristic, and a driver circuit responsive to an output from the computer to generate a corresponding gray-scale image of the hologram on the spatial light modulator.

Preferably the computer is operable to generate a plurality of different predetermined holograms corresponding to respective desired output beam characteristics, to enable on-the-fly selection of a desired output laser beam.

The invention extends to a method of operating a laser using the above defined apparatus.

BRIEF DESCRIPTION OF THE DRAWINGS

FIG. 4a is a schematic diagram of a stable plano-concave resonator with a waist plane at the flat output coupler of the apparatus of FIG. 3;

FIG. 4b shows images of measured intensity profiles for two curvature cases (R=400 mm and R=500 mm), comparing the digital laser output using an SLM to that using physical mirrors;

FIG. 4c is a graph showing how the change in measured beam size with a digitally imposed curvature matches the theoretical curve;

FIG. 4d is a graph illustrating that the threshold of the digital laser is higher than that of the conventional laser due to the additional losses from the SLM, shown for the R=400 mm case;

DESCRIPTION OF PREFERRED EMBODIMENTS

The present invention aims to overcome the current limitations to intra-cavity laser beam shaping through the use of intra-cavity digital holograms. In an example embodiment of the invention, the intra-cavity digital holograms are implemented using a phase-only reflective spatial light modulator (SLM), to form a rewritable holographic mirror in place of the standard laser cavity mirror. As described below, this allows on-demand mode selection with high resolution and with a very wide dynamic range of phase values. Importantly, this "digital laser" may be used to implement amplitude-only, phase-only or amplitude and phase modulation by simply altering the digital hologram (gray-scale picture) written to the SLM device.

Figure 1:
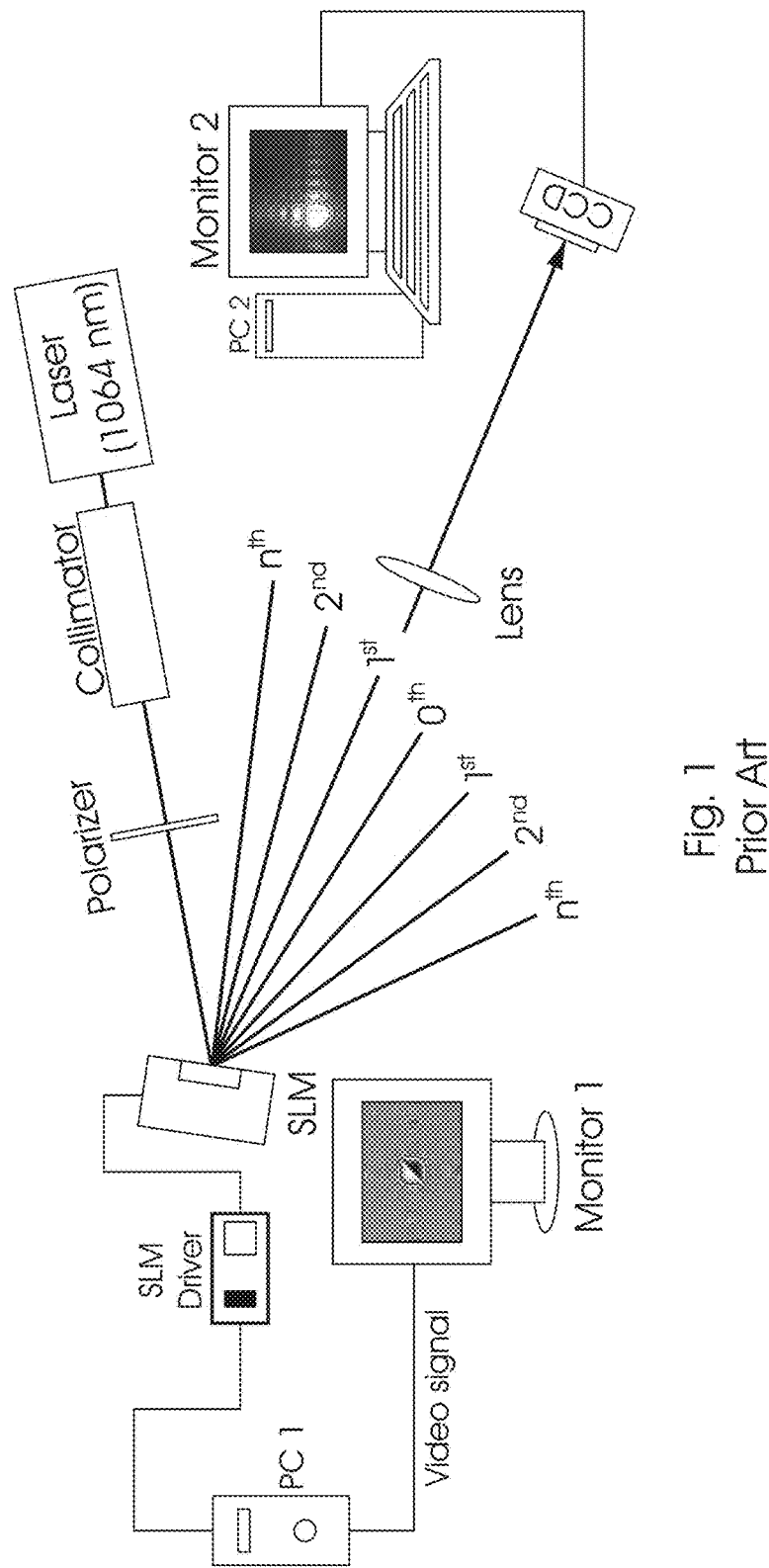
FIG. 1 is a schematic diagram of prior art laser apparatus utilizing extra-cavity beam shaping.

FIG. 1 shows an example of a prior art extra-cavity arrangement in which a spatial light modulator (SLM) is used externally of the laser cavity.

Such extra-cavity use of the SLM involves orientating the polarization of the incident beam to match the polarization of the SLM. In most cases the SLM is placed at an angle to the incident light which requires that it be horizontally polarized so as to accept an incident beam of horizontally polarized light.

The incident beam on the SLM is usually collimated so that it covers a large portion of the surface of the SLM and the intensity of the light is distributed evenly on the surface of the SLM screen. The shaping of the incident beam by the SLM screen is achieved by loading a phase of the required beam and adding a grating to separate the orders of reflected light. The shaping of the incident light always occurs on the 1st order of the reflected beam which mostly contains very little energy. The shaped light would then be captured on a CCD camera and observed on Monitor 2. A large amount of energy is lost in unwanted reflected light.

The $0^{th}$ order light which often contains a large amount of energy does not see the phase pattern on the SLM and therefore will not be shaped by the SLM, even if it is correctly polarized. If one were to observe the profile of the $0^{th}$ order light on the CCD camera, it would have a similar profile to the incident beam on the SLM.

If the SLM was positioned normally relative to the incident beam without a grating, all the orders of light would be superimposed on each other. This would distort the desired beam and is why a grating is generally added to separate the orders.

Figure 2:
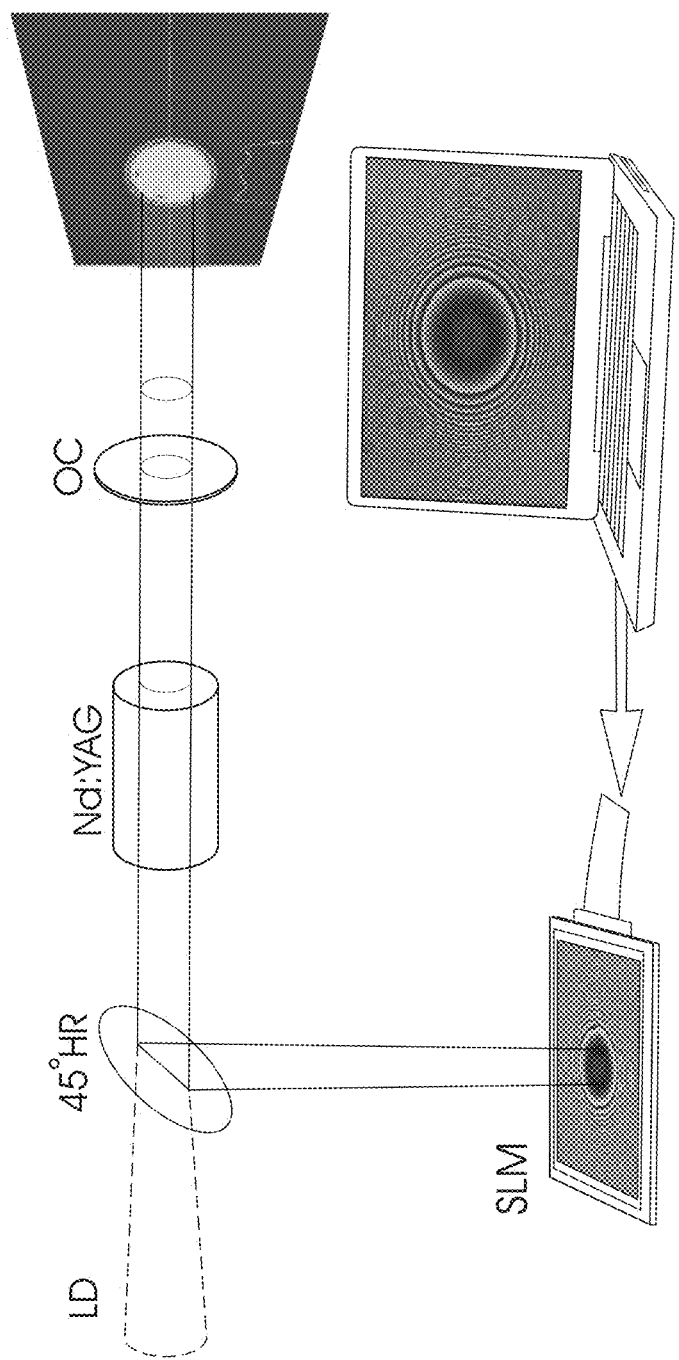
FIG. 2 is a simplified schematic diagram of digital laser apparatus according to the present invention.

Laser apparatus according to an example embodiment of the present invention is shown schematically in FIG. 2. The apparatus consists of a conventional folded resonator configuration with a Nd:YAG laser crystal as the gain medium (see below). What is unconventional is the use of a phase-only reflective SLM as the back optical element of the cavity, thus effectively creating a digitally addressed holographic mirror. The key properties required of the SLM for this application are high resolution, high efficiency, high reflectivity at the desired polarization, small phase-amplitude cross-talk, a reasonable damage threshold and a large phase shift at the laser wavelength.

The Nd:YAG laser is optically pumped by a beam LD from a high-power diode laser that is coupled into the cavity through a 45° mirror coated for high transmission at the diode wavelength (808 nm) and high reflectance at the lasing wavelength (1064 nm). This folding mirror forms an L-shaped cavity so that the high power diode beam does not interact with the SLM, thus avoiding damage. It will be understood that other means to pump the laser could be used, and an L-shaped cavity is not a requirement.

An important feature of the cavity is the use of an intra-cavity Brewster window (see FIG. 3) to force the laser to oscillate in the desired polarization for the SLM (vertical in the prototype setup).

Figure 3:
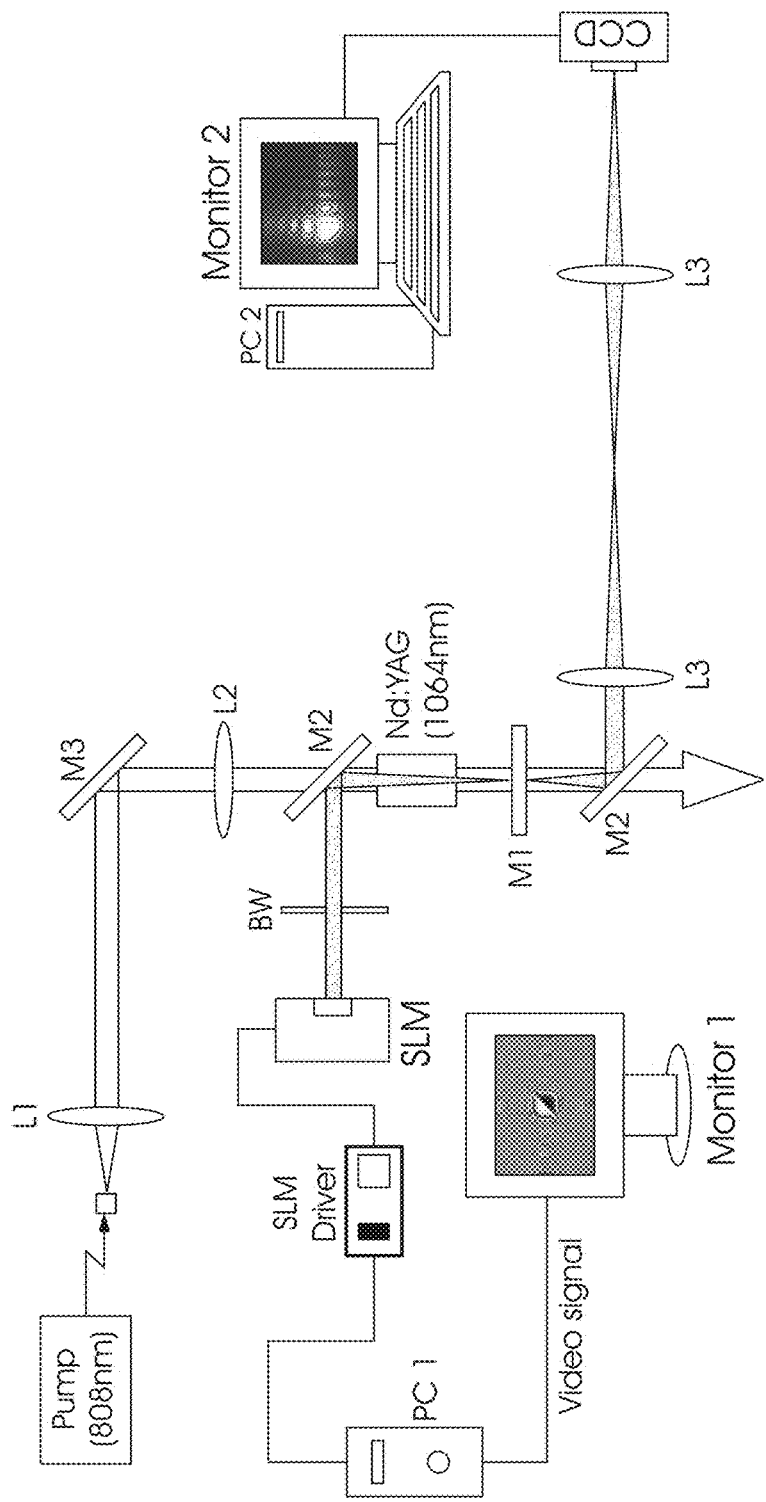
FIG. 3 is a more detailed schematic diagram of the laser apparatus of FIG. 2, including diagnostic and control equipment used with the apparatus.

The apparatus of FIG. 2 is shown in more detail in the block diagram of FIG. 3.

The apparatus includes a laser pump comprising a fiber-coupled laser diode operated at a wavelength of 808 nm. A first spherical lens L1 with a focal length of 25.4 mm is used to collimate the pump beam. A mirror M3 which is highly reflective at the pump beam wavelength and a second spherical lens L2 with a focal length of 150 mm are used to focus the pump beam to a Nd:YAG laser crystal. The pump beam in the prototype setup had a diameter of 2 mm.

An input coupler comprising a first mirror M2 coated for high transmission at the diode wavelength (808 nm) and high reflectance at the lasing wavelength (1064 nm) is oriented at 45° to the incident pump beam and directs the pump beam to the laser crystal, while the lasing beam is directed by the mirror M2 via a Brewster window BW to the spatial light modulator (SLM). The SLM is positioned vertically and is used as an end mirror of the laser cavity. The Brewster window is used to force the laser to operate with a vertical polarization. An output coupler mirror M1 is used which is 40% transmissive at the laser wavelength of 1064 nm.

A second 45° mirror M2 and a pair of spherical lenses L3 with focal lengths of 125 mm were used to image the laser beam at 1064 nm to a CCD camera. The mirrors M2 act as folding mirrors to prevent the pump beam from interacting with or damaging the SLM and CCD camera. The CCD camera was used to capture and analyze the output laser beam from the laser cavity output coupler.

The control equipment used for the laser was a Hamamatsu Liquid Crystal on Silicon Spatial Light Modulator (LCOS-SLM) X10468 Series device which consisted of an LCOS-SLM (SLM) and LCOS-SLM driver all connected to a personal computer PC 1 with a monitor, Monitor 1. The LCOS-SLM control software that was used to operate the device was the manufacturer's software.

The output of the CCD camera was fed to a second personal computer PC 2 with an associated monitor, Monitor 2, for analysis and display.

To operate the system, the necessary digital hologram is first calculated in order to create a desired beam. The image load on the device is the gray-scale form of this digital hologram and is shown on the Monitor 1 of the personal computer PC 1. The personal computer PC 1 transmits the selected image to the SLM driver which then loads the image to the SLM screen. The image on the SLM screen, which acts as an end mirror of the laser cavity, will then mimic the desired phase for the desired laser beam inside the laser cavity. If the desired laser beam is stable inside the laser cavity then that laser beam would be generated by the laser and the output would be observed on Monitor 2 via the CCD camera.

As a proof-of-principle experiment the holographic mirror was programmed to mimic a conventional concave mirror with a radius of curvature, R, chosen to ensure that the resonator formed a stable plano-concave cavity, as indicated schematically in FIG. 4a. This requires a digital hologram of a lens to be programmed to the SLM, with focal length f=R, so that the hologram mimics the curvature of the mirror. The waist size (at the flat output coupler) of the Gaussian mode that oscillates in such a cavity may be described analytically as[1]

$$w_0^2 = (\lambda/\pi)[L(R-L)]^{1/2}, \qquad (1)$$

where L is the effective length of the resonator and λ is the laser wavelength. Prior to testing the digital laser, two physical concave mirrors were used (separately) in the same set-up in place of the SLM, and the Gaussian beam size recorded at the output. The results for these two cases, R=400 mm and R=500 mm, are shown in FIG. 4b and plotted in FIG. 4c together with the theoretical curve following equation (1). The same test curvature examples were programmed digitally and are shown alongside the physical mirror measurements in FIG. 4b. From a mode selection perspective the laser performs identically in the two configurations. Next, as the digital hologram's programmed curvature was changed, as shown in FIG. 4c, so the measured output Gaussian beam size changed in accordance with equation (1).

This confirms that the digital laser behaves as a standard stable cavity and it is clear from the results that the SLM mimics the stable cavity with high fidelity. In addition to confirming the desired behavior of the digital laser, this experiment also brings to the fore another practical advantage: whereas with physical mirrors it is common-place to have a limited and discrete selection on hand, with the digital approach virtually any mirror curvature can be created, on demand, by simply changing the gray-scale image representing the digital hologram, and is limited only by the resolution of the SLM used.

Initial attempts to use an intra-cavity SLM in a laser apparatus of the kind described were unsuccessful. This was determined to be due to the use of SLMs embodying older twisted nematic liquid crystal technology which modulate the phase, but also impart a small phase-dependent residual modulation of the amplitude of a beam reflected off it. The effect of this residual amplitude modulation becomes significant with the SLM inside the resonator and swamps the phase modulation effect, effectively behaving as an amplitude modulator.

Replacing the previous-generation SLM with a new-generation SLM containing parallel-aligned nematic liquid crystal, which causes substantially no phase-dependent amplitude modulation, was found to solve the problem. With such devices the amplitude effects are negligible and the phase effects become dominant, which allows beam-shaping by phase modulation.

It was found that the reflectivity of the SLM as a function of phase needs to have a variance of less than 1% for optimum performance.

The higher losses of the SLM compared with a conventional mirror do manifest themselves as a higher threshold for lasing, as indicated in FIG. 4d. Thus two conditions must be simultaneously satisfied for the digital laser to function: the gain of the laser must be sufficiently high to overcome the losses, but the intra-cavity circulating intensity must not exceed the damage threshold of the SLM. In the described example embodiment these requirements are managed by the use of a high-power pump source and an L-shaped cavity, but there are several other possible valid approaches (e.g. increasing the doping concentration of the crystal). When these conditions are balanced, the digital laser functions as designed.

Figure 5:
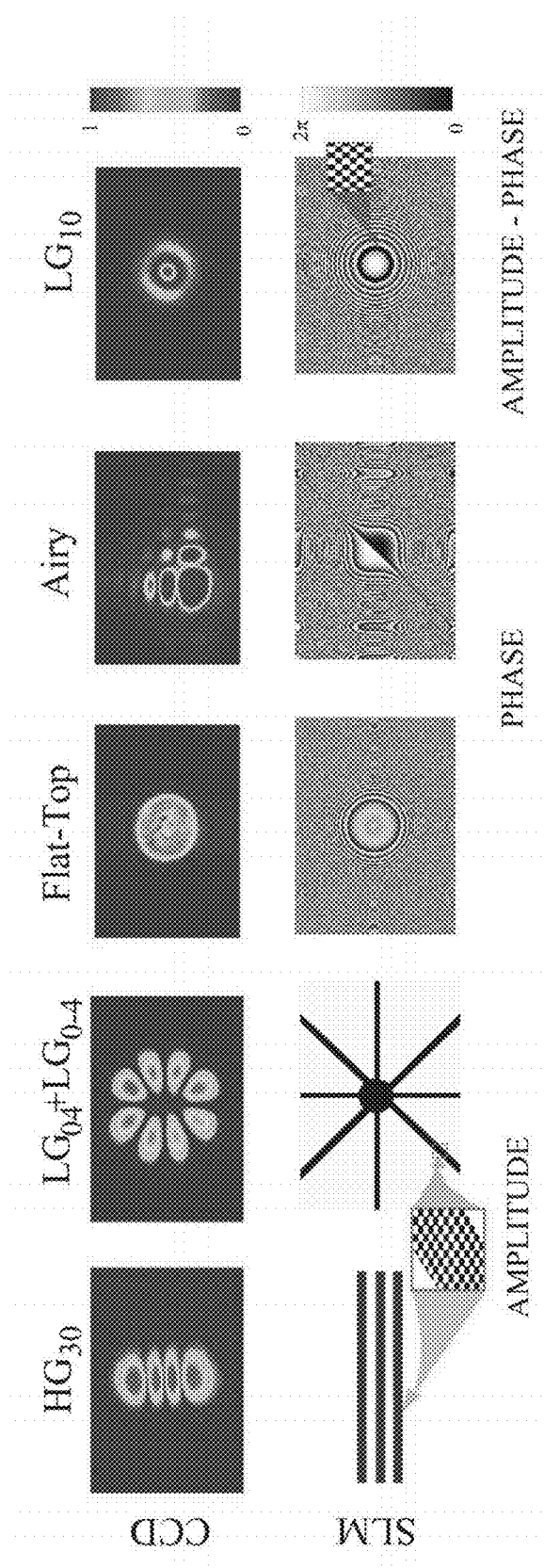
FIG. 5 shows several examples of customized beams generated by the digital laser apparatus of FIGS. 2 and 3, and the corresponding SLM holograms used.

As a final test the described digital laser was employed to selectively generate the well-known Hermite-Gaussian, Laguerre-Gaussian, super-Gaussian (flat-top) and Airy beams (see FIG. 5). By complex amplitude modulation a customised set of high-loss regions create a Hermite-Gaussian beam (n=3, m=0) and a superposition of Laguerre-Gaussian beams (p=0, l=±4) as the laser output. The selection of the Hermite-Gaussian and Laguerre-Gaussian modes exploited complex amplitude modulation to implement amplitude modulation on the phase-only SLM[24]. In other words, the SLM can be used to create customized apertures, for example, the fine wires (loss-lines) used in the past for Hermite-Gaussian mode selection[1,2].

By phase-only modulation a flat-top beam and Airy beam are created as the stable modes of the cavity.

The digital hologram for the creation of the radial Laguerre-Gaussian beam (p=1, l=0) comprised a high-loss annular aperture together with a phase-only radius of curvature. The former was set to the first zero of the Laguerre-Gaussian mode while the latter was used to select and control the mode size. Thus, combining amplitude and phase effects allows for the selection of a Laguerre-Gaussian beam (p=1, l=0) of a chosen size.

Finally, many techniques exist for the design of intra-cavity diffractive optics[5-10] for particular mode selection, all of which may readily be applied to the digital laser. This is illustrated in FIG. 5 where an Airy beam[25] and flat-top beam[7] are created by phase-only digital holograms. Finally it can be noted that the switching from one mode to another required nothing more than a change to the gray-scale image making up the digital hologram—no realignment and no additional optical elements are required. Traditionally, to create the spectrum of modes shown in FIG. 5 would require several laser resonator set-ups, each with a custom (expensive) optic.

In conclusion, the novel digital laser of the invention allows arbitrary intra-cavity laser beam shaping to be executed on the fly. The digital laser can replicate conventional stable resonator cavities as well as "custom" laser resonators to produce more exotic laser modes. The digital laser is at present limited in the power that it can output, but this may be overcome with careful engineering of bespoke liquid crystals. Just as SLMs external to the laser cavity have proved an excellent means for testing high power beam shaping elements prior to fabrication, and have in the process opened up many avenues for low average power applications of structured light (e.g., holographic optical tweezers) so the digital laser may well become a robust, easy-to-implement test bed for intra-cavity beam shaping ideas. Moreover, since the digital laser is rewritable one can envisage dynamic intra-cavity beam shaping, for example, in controlling thermal lensing and aberrations in real-time, to real-time mode control and switching. Customized laser modes are now only a picture away.

EXAMPLE

Several spatial light modulators (SLMs) were used in the testing of the digital laser, and finally a Hamamatsu (LCOS-SLM X110468E) series SLM device was selected for the digital laser. Previous tests with other SLMs failed mainly due to the phase-amplitude coupling which becomes pronounced during intra-cavity operation. The gain medium was a 1% doped Nd:YAG crystal rod with dimension of 30 mm (length) by 4 mm (diameter). The crystal was end-pumped with a 75 W Jenoptik (JOLD 75 CPXF 2P W) multimode fibre-coupled laser diode operating at 808 nm. The output coupler (flat curvature) had a reflectivity of 60% while the SLM had a measured reflectivity of 91% at the desired polarisation (vertical) and 93% at the undesired polarisation (horizontal).

In order to force the cavity to lase on the vertical polarisation, an intra-cavity Brewster plate was used. On this polarisation, calibration tests on the SLM reveal typical efficiencies of ~86% into the first order and ~1% into the zero$^{th}$ order. In the intra-cavity configuration this large difference results in suppression of the zero$^{th}$ order due to the significantly higher round trip losses, and thus the SLM could be operated at normal incidence and without a grating. The SLM efficiency had a standard deviation of ~0.4% across all gray levels, i.e. minimal amplitude effects during phase modulation.

The nominal length of the cavity was approximately 390 mm, but was determined to have an effective length of 373 mm in order to compensate for the small thermal lensing due to pump absorption in the crystal as well as the refractive index of the crystal. The effective length was used in all calculations for the mode sizes. The resonator output was 1:1 imaged onto a Spiricon CCD camera for intensity measurements, and could also be directed to a second SLM for modal decomposition studies. For far field tests the first lens of the telescope was removed.

Placing the SLM inside the laser cavity at normal incident without a grating overcomes a number of challenges:

1. Phase Modulation by the SLM:

The requirement for the SLM to behave as a phase-only element means that when slowly changing the gray-scale colour image which is loaded on the SLM screen from black to white, the reflected 1$^{st}$ order beam power should not change, or there should be very little change in power, as the gray-scale image is changed. If one were to replace the CCD camera in FIG. 3 with a power meter and if a significant drop in power over a large range of gray-scale levels is measured, then the SLM would be behaving as an amplitude modulator instead of phase modulator.

Figure 6:
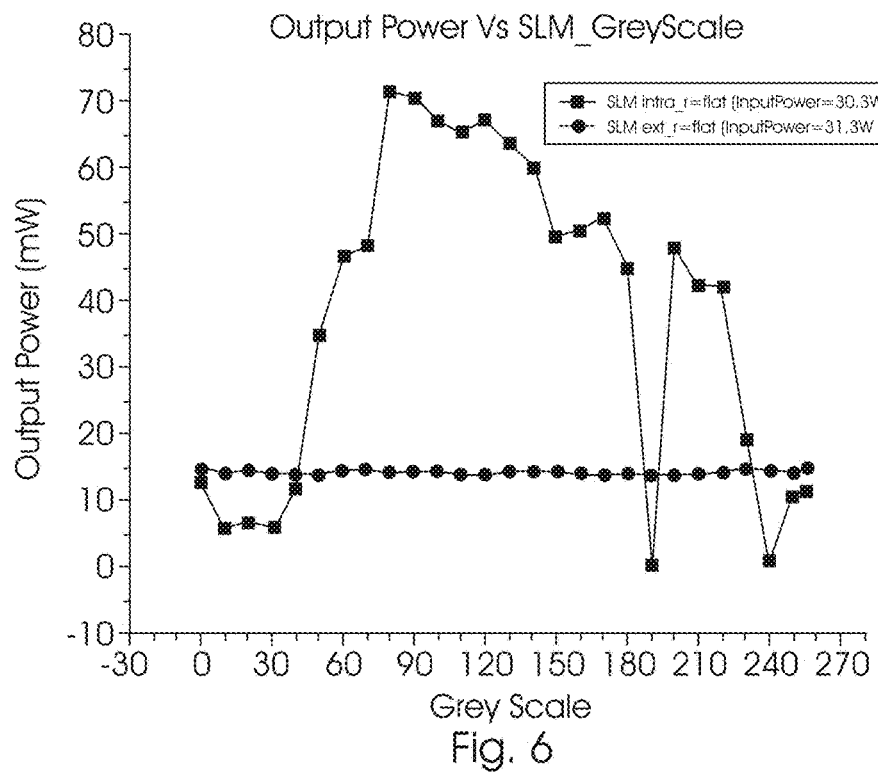
FIG. 6 is a graph showing two plots of reflected laser power versus change in gray-scale level from black (0) to white ($2\pi$) for an older generation SLM used in an extra-cavity mode and an intra-cavity mode.

FIG. 6 illustrates the power of the reflected 1$^{st}$ order beam from an older-generation Holoeye SLM, when placed outside or inside the cavity, as a function of the displayed gray-scale levels from black (0) to white ($2\pi$). It is evident from FIG. 6 that there are minimal fluctuations in output power when the SLM is placed outside the cavity (horizontal plot). This explains why the method of placing the SLM outside the cavity to shape the incident light has been successful for many years.

However, placing the SLM inside the cavity and changing the gray-scale levels from black to white creates large fluctuations in the output power of the laser (irregular plot). This is because inside the laser cavity the small fluctuations are amplified due to the many round trips that the light has to perform. This made the older SLM unsuitable as a phase-only SLM for intra-cavity use.

Figure 7:
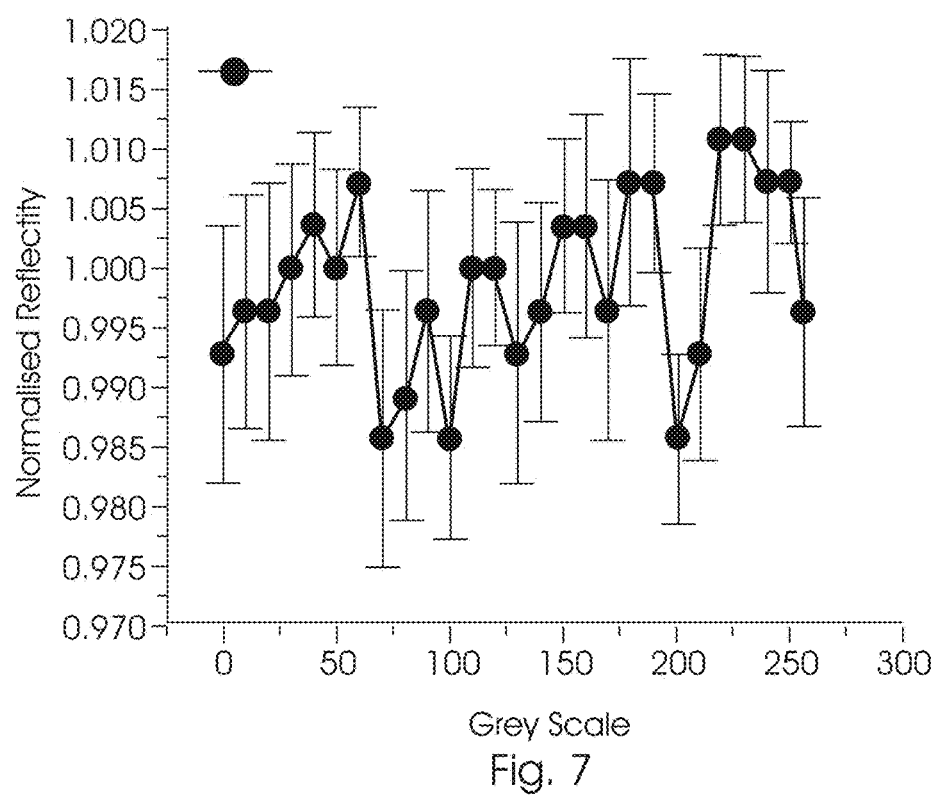
FIG. 7 is a graph of normalized reflected power versus change in gray-scale level from black to white for a newer generation SLM used in the laser apparatus of the invention.

Tests were then carried out on a more modern Hamamatsu SLM as described above. The measured power fluctuations were normalised and a standard deviation of ~0.4% across all gray levels was observed for the as shown in FIG. 7. This greater linearity of the Hamamatsu SLM made it suitable for intra-cavity use as described above.

2. Polarisation:

The normal cavity polarization of the laser light without the SLM was determined to be horizontally polarised. An obvious approach would have been to replace the end mirror with an SLM placed horizontally, with 93% reflectivity, to allow the incident light to also be horizontally polarized. However, in the described apparatus the SLM was placed vertically where it was 91% reflective. During operation, the majority of the laser light was automatically converted by the SLM to be vertically polarised and very little light was horizontally polarised. This resulted in the laser operating with dual polarizations where the vertically polarized light "sees" the image on the SLM and is therefore shaped while the horizontally polarized light did not "see" the image on the SLM and was therefore not shaped.

This was solved by inserting a Brewster window inside the cavity which caused high losses for the horizontally polarized light by coupling it out of the laser cavity and allowed only the vertically polarized light to oscillate inside the cavity.

3. Coupling out the 0$^{th}$ Order from the Cavity:

The vertically polarised 0$^{th}$ order beam or n$^{th}$ order beams which did not see the image on the SLM were also allowed to oscillate inside the cavity with the 1$^{st}$ order beam, even though the Brewster window was inserted inside the cavity. However it was determined that the laser was automatically discriminating against these unwanted beams. After analysing the reflected 1$^{st}$ order beam from the SLM, its efficiency was between ~86-91% compared to the 0$^{th}$ order beam which was ~1% efficient. This large difference in efficiency over many cavity round-trips caused the 1$^{st}$ order beam to dominate over the 0$^{th}$ order, effectively removing it. Thus, effectively the laser would self-converge to the required laser beam, making it unnecessary to use an optimization algorithm to force the laser to converge to the desired laser beam.

4. Damage Threshold of SLM:

In most experiments involving digital SLMs the incident beam is always collimated and expanded to cover a large area on the SLM. This is done to achieve a better performance from the SLM and also to reduce the amount of power per unit area on the SLM which will then minimise the possibility of damaging the SLM. The maximum quoted damage threshold for the Hamamatsu LCOS-SLM is 2.0 W/cm$^2$ for 100 hours of exposure. This low power damage threshold also explains why it has not previously been attempted to insert the SLM inside the cavity, where the laser intensity is usually very high, typically more than 90% greater compared to external use of the SLM.

A conventional approach would be to insert collimators, beam expanders or telescopes inside the laser cavity if one wanted to use the SLM inside the cavity, so as to achieve a large beam on the SLM. This would be expected to give better performance and minimise the risk of damaging the SLM. However the inclusion of such additional optics inside the laser cavity also would tend to preclude the creation of a versatile device which could produce different kinds of beam on demand, since every time the desired hologram was calculated one would have to take into account the telescope effects inside the cavity which require critical alignment of the components every time a hologram is loaded on to the device for stable and correct operation.

However, experiments showed that only approximately 5 pixels in radius of the desired beam are required to generate and sustain that beam inside the laser cavity. This was because inside the laser cavity intensity levels of the light are amplified due to a large number of cavity round-trips compared to when the SLM is used externally as a reflective shaping mirror, where the reflected beam only interacts with the SLM only once.

Experiments also showed that the damage threshold of the LCOS-SLM was much higher than the quoted limit of 2 W/cm$^2$, and was tested to 25 W/cm$^2$ with no visible damage being observed on the SLM. The high damage threshold and small area requirement on the SLM for shaping light made it possible to remove the telescope system inside the cavity and keep the cavity simple. This means that to create a certain beam which will oscillate in a specific laser cavity length one needs only to calculate the hologram by treating the laser cavity as if it was a bare cavity. The only thing that needs to be taken into account is the refractive index of the crystal, and if the crystal is very short one could even ignore its effect.

The described digital laser is unique in that it needs only an SLM and no exotic solutions to control the laser beam. It works with commercially available SLMs which meet the above requirements. Another advantage of the described laser apparatus is that it is very short, approximately 0.25 m, compared to much larger known apparatus. The main practical constraint of the apparatus is the need for SLMs with a higher damage threshold for higher power operation.

REFERENCES

1. Hodgson, N., & Weber, H. *Laser Resonators and Beam Propagation*. $2^{nd}$ ed. (Springer, New York, 2005).
2. Siegman, A. E. Laser beams and resonators: The 1960s. *IEEE J. Sel. Top. Quantum Electron.* 6, 1380-1388 (2000).
3. Siegman, A. E. Laser beams and resonators: Beyond the 1960s. *IEEE J. Sel. Top. Quantum Electron.* 6, 1389-1399 (2000).
4. Dickey, F. M., & Holswade S. *Laser Beam Shaping: Theory and Techniques*. (Marcel Dekker, New York, 2000).
5. Belanger, P. A., & Pare C. Optical resonators using graded-phase mirrors. *Opt. Lett.* 16, 1057-1059 (1991).
6. Pare, C., Gagnon, L., & Belanger, P. A. Aspherical laser resonators: An analogy with quantum mechanics. *Phys. Rev. A* 46, 4150-4160 (1992).
7. Litvin, I. A., & Forbes, A. Intra-cavity flat-top beam generation. *Opt. Express* 17, 15891-15903 (2009).
8. Litvin, I. A., & Forbes, A. Gaussian mode selection with intracavity diffractive optics. *Opt. Lett.* 34, 2991-2993 (2009).
9. Kuznetsov, M., Stern, M., & Coppeta, J. Single transverse mode optical resonators. *Opt. Express* 13, 171-181 (2005).
10. Tiffany, B., & Leger, J. Losses of bound and unbound custom resonator modes. *Opt. Express* 15, 13463-13475 (2007).
11. Bélanger, P. A., Lachance, R. L., & Pare, C. Super-Gaussian output from a CO2 laser by using a graded-phase mirror resonator. *Opt. Lett.* 17, 739-741 (1992).
12. Leger, J. R., Chen, D., & Wang, Z. Diffractive optical element for mode shaping of a Nd:YAG laser. *Opt. Lett.* 19, 108-110 (1994).
13. Leger, J. R., Chen, D., & Dai, K. High modal discrimination in a Nd:YAG laser resonator with internal phase gratings. *Opt. Lett.* 19, 1976-1978 (1994).
14. Caley, A. J., Thomson, M. J., Liu, J., Waddie, A. J., & Taghizadeh, M. R. Diffractive optical elements for high gain lasers with arbitrary output beam profiles. *Opt. Express* 15, 10699-10704 (2007).
15. Litvin, I. A., Burger, L., & Forbes, A. Petal-like modes in Porro prism resonators. *Opt. Express* 15, 14065-14077 (2007).
16. Naidoo, D., Ait-Ameur, K., Brunel, M., & Forbes, A. Intra-cavity generation of superpositions of Laguerre-Gaussian beams. *Appl. Phys. B* 106, 683-690 (2012).
17. Bourderionnet, J., Brignon, A., Huignard, J.-P., Delboulbe, A., & Loiseaux, B. Spatial mode control of a diode-pumped Nd:YAG laser by an intracavity liquid-crystal light valve. *Opt. Lett.* 26, 1958-1960 (2001).
18. Dainty, J. C., Koryabin, A. V., & Kudryashov, A. V. Low-order adaptive deformable mirror. *Appl. Opt.* 37, 4663-4668 (1998).
19. Lubeigt, W., Valentine, G., Bente, E., & Burns, D. Active transverse mode control and optimization of an all-solid-state laser using intracavity adaptive-optic mirror. *Opt. Express* 10, 550-555 (2012).
20. Cherezova, T. Y., Kaptsov, L. N., & Kudryashov, A. V., Cw industrial rod YAG:Nd3+ laser with an intracavity active bimorph mirror. *Appl. Opt.* 35, 2554-2561 (1996).
21. Lubeigt, W., Griffith, M., Laycock, L., & Burns, D. Reduction of the time-to-full-brightness in solid-state lasers using intra-cavity adaptive optics. *Opt. Express* 17, 12057-12069 (2009).
22. Lubeigt, W., Gomes, J., Brown, G., Kelly, A., Savitski, V., Uttamchandani, D., & Burns, D. Control of solid-state lasers using an intra-cavity MEMS micromirror. *Opt. Express* 19, 2456-2465 (2011).
23. Piehler, S., Weichelt, B., Voss, A., Ahmed, M. A., & Graf, T. Power scaling of fundamental-mode thin-disk lasers using intracavity deformable mirrors. *Opt. Lett.* 37, 5033-5035 (2011).
24. Arrizon, V., Ruiz, U., Carrada, R., & Gonzalez, L. A. Pixelated phase computer holograms for the accurate encoding of scalar complex fields. *J. Opt. Soc. Am. A* 24, 3500-3507 (2007).
25. Porat, G., Dolev, I., Barley, O., & Arie, A. Airy beam laser. *Opt. Lett.* 36, 4119-4121 (2011).

The invention claimed is:

1. Laser apparatus including:
an output coupler;
a gain medium for generating laser light;
a rear optical element;
an input coupler arranged to direct a pump beam to the gain medium and to define an optical path between the output coupler and the rear optical element, wherein the input coupler comprises a folding mirror that forms an L-shaped cavity, the output coupler comprises a flat curvature, and the rear optical element is a spatial light modulator arranged to act as an intra-cavity digital holographic mirror and to display selectively a grayscale image of a hologram thereby to phase-modulate laser light in the cavity, to generate an output laser beam having a desired shape characteristic; and
an intra-cavity Brewster window to assist the spatial light modulator to operate with a desired polarization, vertical or horizontal.

2. The laser apparatus of claim 1 wherein the spatial light modulator is a phase-only reflective device arranged to operate as a digitally addressed holographic mirror.

3. The laser apparatus of claim 2 wherein the spatial light modulator is arranged at normal incidence in the cavity.

4. The laser apparatus of claim 2 wherein the spatial light modulator has a reflectivity as a function of phase with a variance of less than 1%.

5. The laser apparatus of claim 4 wherein the spatial light modulator is a device comprising parallel-aligned nematic liquid crystal.

6. The laser apparatus of claim 1 wherein the input coupler comprises a first mirror coated for high transmission at the pump beam wavelength and high reflectance at a lasing beam wavelength, and which is oriented to direct the pump beam to the gain medium, and to direct a lasing beam to the spatial light modulator.

7. The laser apparatus of claim 6 wherein the output coupler comprises a second mirror coated for high transmission at the pump beam wavelength and high reflectance at the lasing beam wavelength, and which is oriented to separate the pump beam and the output laser beam.

8. The laser apparatus of claim 1 including a computer arranged to generate at least one hologram corresponding to a desired output beam characteristic, and a driver circuit responsive to an output from the computer to generate a corresponding gray-scale image of the hologram on the spatial light modulator.

9. The laser apparatus of claim 8 wherein the computer is operable to generate a plurality of different predetermined holograms corresponding to respective desired output beam characteristics, to enable on-the-fly selection of a desired output laser beam.

* * * * *